United States Patent [19]

Mita

[11] 4,428,690

[45] Jan. 31, 1984

[54] THERMAL RECORDING PRINT HEAD

[75] Inventor: Tsunemasa Mita, Ebina, Japan

[73] Assignee: Fuji Xerox Co., Ltd., Tokyo, Japan

[21] Appl. No.: 380,600

[22] Filed: May 21, 1982

[30] Foreign Application Priority Data

Jul. 24, 1981 [JP] Japan ................................ 56-115396

[51] Int. Cl.$^{3}$ ............................................. G01D 15/10

[52] U.S. Cl. ................................ 400/120; 346/76 PH; 219/216

[58] Field of Search ................................ 400/119, 120; 346/76 PH, 1.1; 219/216 PH

[56] References Cited

U.S. PATENT DOCUMENTS

| | | | |
|---|---|---|---|
| 4,032,925 | 6/1977 | Kos | 219/216 PH |
| 4,074,109 | 2/1978 | Baraff et al. | 219/216 PH |
| 4,141,018 | 2/1979 | Mizuguchi et al. | 219/216 PH |
| 4,203,119 | 5/1980 | Naguib et al. | 219/216 PH |
| 4,250,375 | 2/1981 | Tsutsumi et al. | 219/216 PH |
| 4,251,822 | 2/1981 | Hara et al. | 346/76 PH |
| 4,252,991 | 2/1981 | Iwabushi | 219/216 PH |
| 4,322,733 | 3/1982 | Moriguchi et al. | 219/216 PH |
| 4,327,365 | 4/1982 | Noda | 346/76 PH |
| 4,366,489 | 12/1982 | Yamaguchi | 219/216 PH |
| 4,374,385 | 2/1983 | Yoshizanl et al. | 346/76 PH |

FOREIGN PATENT DOCUMENTS

| | | | |
|---|---|---|---|
| 2420272 | 11/1979 | France | 400/120 |
| 52-37054 | 3/1977 | Japan | 400/120 |
| 56-25472 | 3/1981 | Japan | 346/76 PH |

*Primary Examiner*—E. H. Eickholt

*Attorney, Agent, or Firm*—Sughrue, Mion, Zinn, Macpeak, and Seas

[57] ABSTRACT

A thermal recording print head in a thermal recording system using a heat generating resistor unit made up of elements arranged adjacent to one another. The heat generating elements are arranged in a plurality of lines in an auxiliary scanning direction.

5 Claims, 8 Drawing Figures

THERMAL RECORDING PRINT HEAD

BACKGROUND OF THE INVENTION

This invention relates to a thermal recording print head which is used in various heat-sensitive recording systems as a printer, a facsimile or the like.

A conventional thermal recording print head is constructed as shown in FIG. 1. A process of driving such a print head is shown in FIG. 2. In FIG. 2, the horizontal axis represents time. In the operation of the FIG. 2 process, one printing line is divided into four blocks shown on the vertical axis. "Transferring and printing" appearing in FIG. 2 as "T" and "P" means that a time series signal from an external signal source is stored in a shift register or the like during the transfer, and upon completion of the storage, printing is carried out simultaneously. The external signal is transferred to the second block after the printing in the first block is completed. Printing is therefore carried out successively in such a fashion. For instance, in the case where a large part of a line is blank, printing can be carried out with one line as one block, and in this case, one line printing time is much shorter. However, since sheet feeding time is always included for a line to determine total printing time, as can be appreciated from FIG. 3, the sheet feeding time cannot be reduced by itself. Therefore, the sheet feeding time is an obstruction tending to reduce a high speed printing operation.

The reason why printing is carried out twice is that the electric source lines are separated into a group of odd-number lines and a group of even-number lines. For instance, in order to cause the shaded part of the heat generating resistor unit in FIG. 8 to generate heat, the signal line 2 and the electric source lines 1 and 1′ are selected. If, in this case, the line 2′ is selected, the part indicated by the arrow also generates heat. That is, printing is achieved as required by selecting every other power source line with respect to a particular signal line.

SUMMARY OF THE INVENTION

Accordingly, an object of this invention is to provide a thermal recording print head in which the above-described drawbacks accompanying a conventional thermal recording print head are eliminated.

Another object of the invention is to provide a thermal recording print head in which heat generating elements are arranged in two lines, to reduce the sheet feeding time to a time that is shorter than that in a conventional thermal recording print head.

The foregoing objects of the invention have been achieved by the provision of a thermal recording print head using a heat generating resistor unit made up of elements arranged adjacent to one another. In accordance with the invention, the heat generating resistor units are arranged in a plurality of lines in the auxiliary scanning direction.

DESCRIPTION OF THE PREFERRED EMBODIMENTS

The invention will be described with reference to its preferred embodiments.

Figure 1:
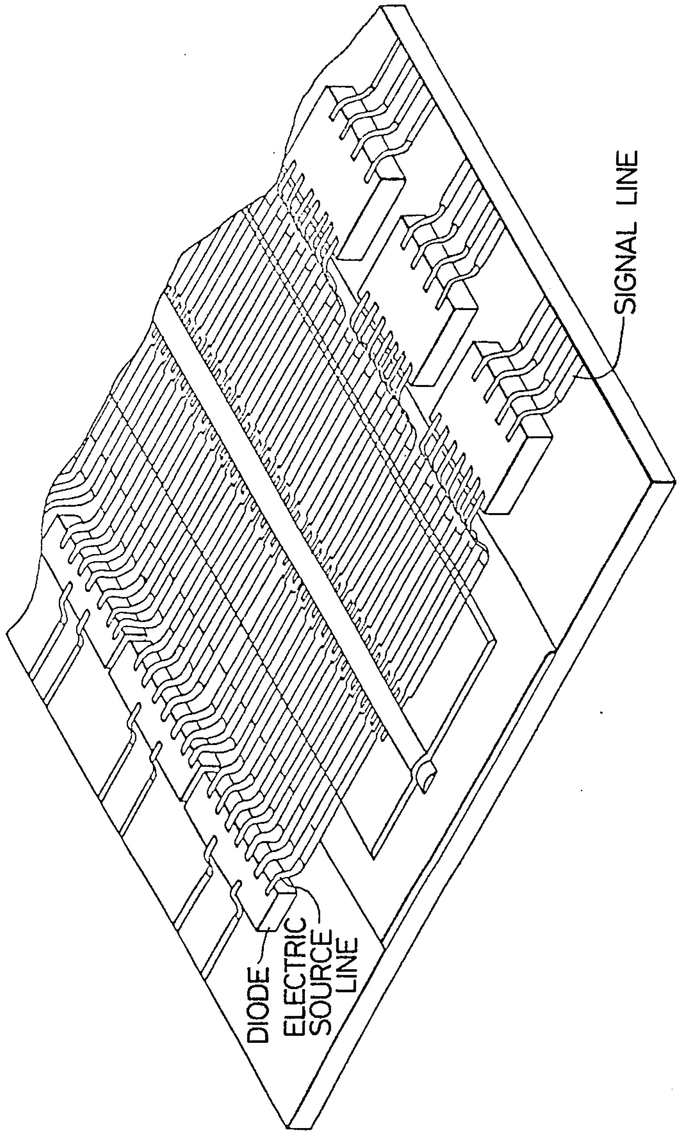
FIG. 1 PRIOR ART
FIG. 1 is a perspective view showing one example of a conventional thermal recording print head.
Figure 2:
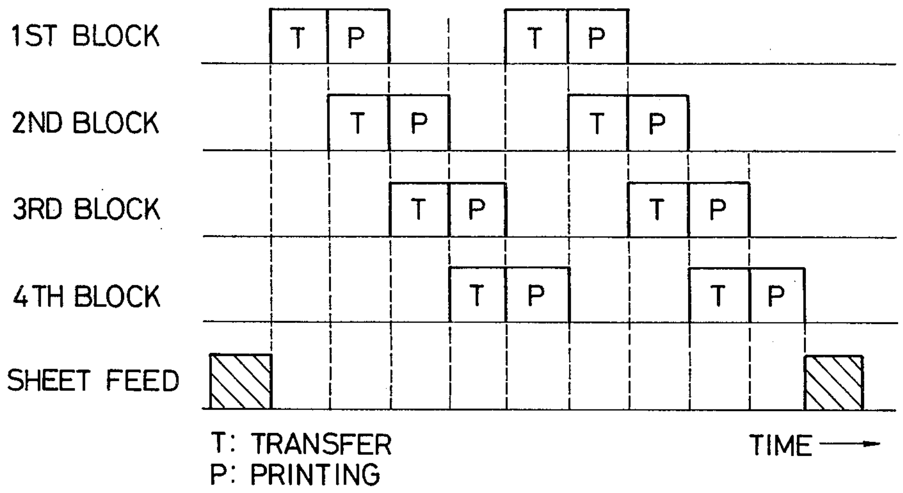
FIG. 2 PRIOR ART
FIG. 2 is a diagram showing one example of a process of driving the print head in FIG. 1.
Figure 3:
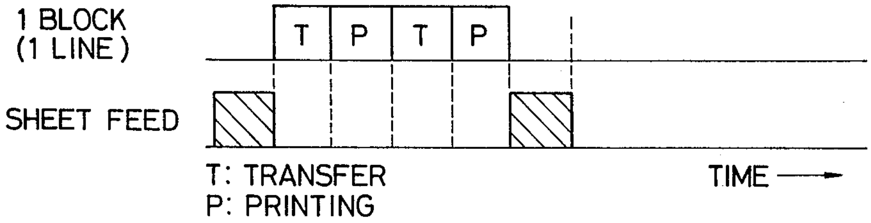
FIG. 3 is a diagram showing another example of the driving process of FIG. 1.
Figure 4:
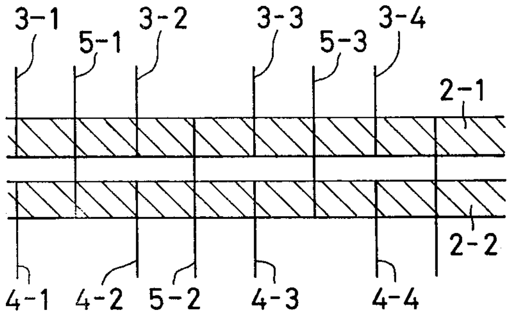
FIG. 4 is a plan view of a thermal recording print head forming one embodiment of this invention.

FIG. 4 is a plan view of a print head forming one embodiment of this invention. In FIG. 4, reference characters 2-1 and 2-2 designate heat generating resistor units arranged in two lines. Each of the units is made of a plurality of heat generating elements disposed adjacent to one another. The heat generating resistor units extend in parallel with the auxiliary scanning direction of the print head. Current is applied through individual signal lines 3-1, 3-2, et seq. and common signal lines 5-1, 5-2, et seq. to the heat generating resistor unit 2-1 to heat this unit. Similarly, current is applied through individual signal lines 4-1, 4-2, et seq. and the common signal lines 5-1, 5-2, et seq. to the heat generating resistor unit 2-2 to heat this unit.

Figure 5:
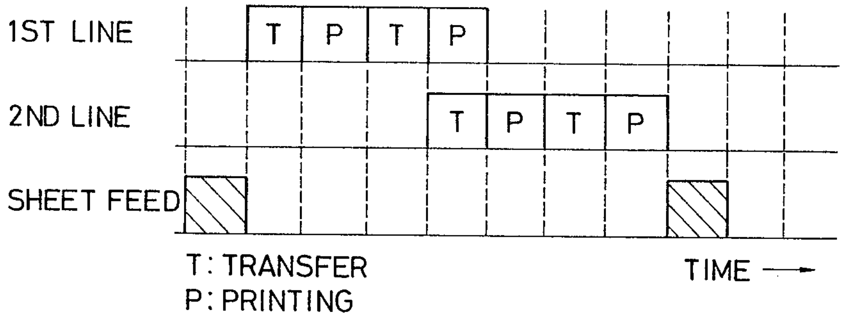
FIG. 5 is a diagram showing one example of a process of driving the print head in FIG. 4.

In this case, the relation between the sheet feeding time and the printing time is indicated in FIG. 5. As shown, the printing operation is carried out with one line forming one block. In this embodiment, two lines can be printed every sheet feeding operation. Accordingly, the sheet feeding time is only one-half (½) of that with the conventional print head in which one heat generating resistor unit is employed; that is, printing can be achieved at higher speed.

In this embodiment, the common signal lines 5-1, 5-2, 5-3, et seq. extend alternately in the opposite directions on both sides of the heat generating resistor unit, with the connection to an external circuit therefore taken into account. However, it is apparent that the common signal lines can extend solely in one direction if the external circuit is suitably arranged. Furthermore, if the electric source has a sufficiently large capacity, the first and second lines may be printed simultaneously depending on the design of the external circuit. In this case, the printing time is further reduced.

Figure 6:
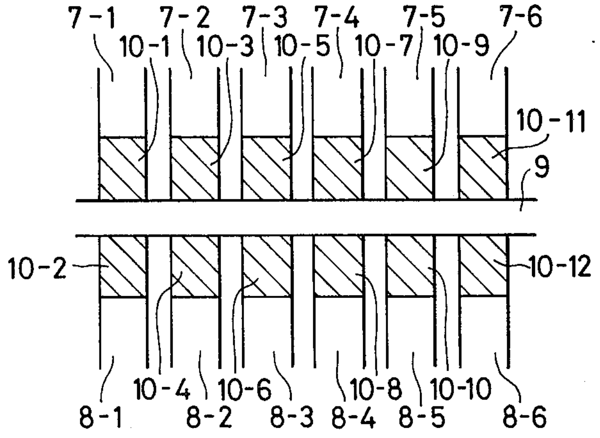
FIG. 6 is a plan view of a thermal recording print head forming a second embodiment of the invention.

FIG. 6 is a plan view of a printing head showing the second embodiment of the invention. In FIG. 6, reference characters 10-1, 10-2, et seq. designate heat generating resistor units made up of heat generating elements.

Figure 7:
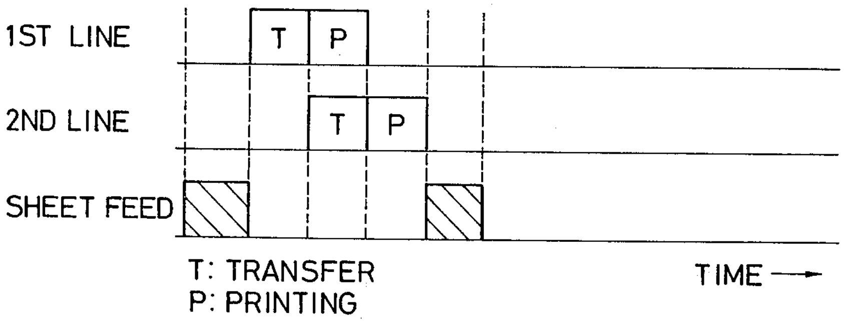
FIG. 7 is a diagram showing one example of a process of driving the print head in FIG. 6.
Figure 8:
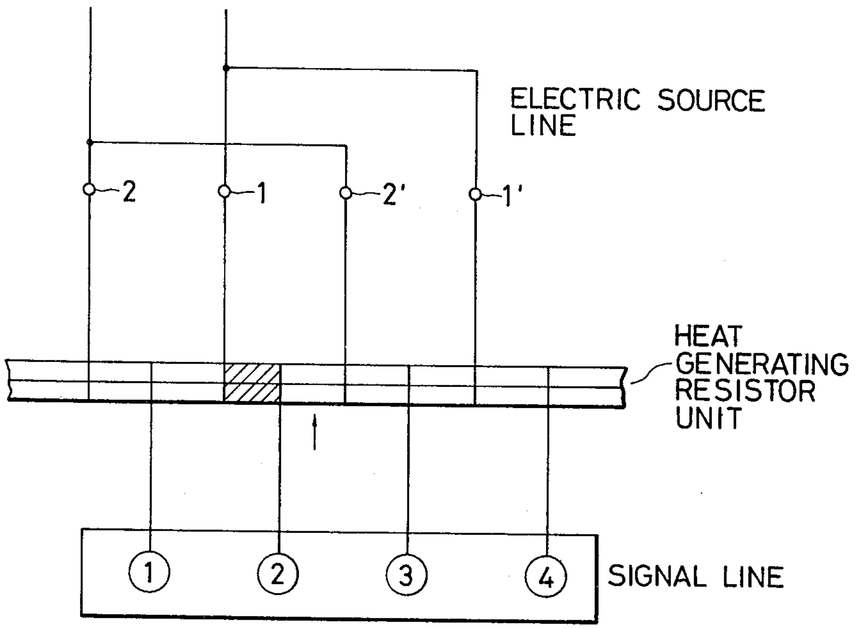
FIG. 8 is a diagram showing electric source lines and signal lines in a thermal recording print head.

The "odd" numbered heat generating resistors 10-1, 10-3, 10-5, et seq. are arranged in one line, while the "even" numbered heating generating resistor units 10-2, 10-4, 10-6, et seq. are arranged also in one line, separate from the first line. Current is applied through individual signal lines 7-1, 7-2, 7-3, et seq. and a common signal line 9 to selective heat generating resistor units 10-1, 10-3, 10-5, et seq. in the first group to heat those units. Similarly, current is applied through individual signal lines 8-1, 8-2, 8-3, et seq. and the common signal line 9 to selective heat generating resistor units 10-2, 10-4, 10-6, et seq. in the second group to heat those units. In the second embodiment, the relation between the sheet feeding time and the printing time is indicated in FIG. 7.

In this embodiment, the rate of the sheet feeding time with respect to one line printing time is longer than the printing time, and therefore the superiority of the embodiment to the conventional system is further increased. Also, in this embodiment, the first and second lines can be printed simultaneously as described before.

In the above-described embodiments, the distance between two lines of heat generating resistor units should coincide with the auxiliary scanning density. However, it may be set to twice the auxiliary scanning density if the external circuit is suitably designed. In this case, printing is carried out in the order of the first line and the third line, the second line and the fourth line, and so forth.

In the above-described embodiments, the heat generating resistor units are arranged in two lines; however, the invention is not limited thereto or thereby. Theoretically, the heat generating resistor units can be arranged in more than two lines. In this case, problems with the heat generating resistor units being partially short-circuited or individual signal lines short-circuited because the heat generating resistors units are arranged adjacent to one another, can be eliminated.

Other modifications of this invention may be practiced without departing from the scope thereof.

What is claimed is:

1. In a thermal recording print head for use in a thermal recording system having means for controlling the heating of said print head, said print head arranged in a recording medium feeding path defining a main scanning direction and an auxiliary scanning direction for printing, comprising:

a heat generating resistor unit having a plurality of heat generating elements arranged adjacent to each other and forming a line, and a plurality of such lines of said heat generating elements arrayed orthogonal with the auxiliary scanning direction of said heat with the elements of one line aligned with the elements of a second line, wherein printing of two lines orthogonal with said auxiliary scanning direction occurs for each advance of said recording medium in said auxiliary scanning direction.

2. A thermal recording print head of claim 1, further comprising an individual signal line for each resistor and a common signal line coupled to individual heat generating elements in at least two lines.

3. A thermal recording print head of claim 2, wherein said common signal line is positioned between two adjacent individual signal lines for each line of elements.

4. A thermal recording print head of claim 1, further comprising said elements arranged as segments in a spaced relationship with even number segments forming one line and odd number segments forming a second line and a common signal line positioned between said lines and coupling all segments of said first and second lines.

5. The thermal recording print head of claim 4, wherein the spacing between segments corresponds with the auxiliary scanning density of said thermal recording system.

* * * * *